United States Patent

[11] 3,619,378

[72] Inventor Pierre Jean Ricard
 Paris, France
[21] Appl. No. 713,897
[22] Filed Mar. 18, 1968
[45] Patented Nov. 9, 1971
[73] Assignee Compagnie Generale D'Etudes
 Cegelerg, France
[32] Priority Mar. 17, 1967
[33] France
[31] 99,379

[54] MULTISTAGE VERTICAL FLASH DISTILLATION APPARATUS HAVING LOW HEAT CONSUMPTION
 16 Claims, 7 Drawing Figs.
[52] U.S. Cl. .................................................. 202/173,
 202/181, 202/187, 202/197, 202/176, 202/236,
 203/1, 203/11, 203/86, 203/88, 203/90, 203/DIG.
 17, 159/18
[51] Int. Cl. ...................................................... B01d 3/06
[50] Field of Search .......................................... 202/236,
 173, 181, 197, 187, 158; 203/11, 88, 10, 89, 90,
 86, 1; 159/18

[56] References Cited
 UNITED STATES PATENTS
 1,799,478 4/1931 Peebles .................... 159/18
 2,051,545 8/1936 Collins ..................... 202/158
 2,606,146 8/1952 Luten ....................... 202/236
 2,938,866 5/1960 Engel et al. ................ 203/88
 3,233,879 2/1966 Mitchell .................... 202/158
 3,444,049 5/1969 Starmer et al. ............ 203/11
 3,450,601 6/1969 Brown ...................... 159/18

Primary Examiner—Wilbur L. Bascomb, Jr.
Attorney—Craig, Antonelli & Hill

ABSTRACT: Apparatus for distilling with low heat consumption a liquid having dissolved salts, by successive evaporation and expansion, including:

at least one cylindrical column formed of vertical sidewalls associated with external cooling means operating with laminar flow of a cooling liquid circulating from the bottom upwards and a plurality of transverse partitions each comprising a central portion collecting liquid to be distilled and a peripheral portion collecting the liquid condensed on the inner face of the said sidewall, the said portion which collects the liquid to be distilled being formed at its lower end with calibrated holes to permit the injection of the liquid to be distilled into the distillation cell defined by the volume of the column comprised between two consecutive transverse walls, the injection being effected under the action of the pressure difference between two consecutive distillation cells, and the liquid to be distilled cooling as it descends from cell to cell through the distillation column.

INVENTOR
PIERRE JEAN RICARD

BY Craig & Antonelli
ATTORNEYS

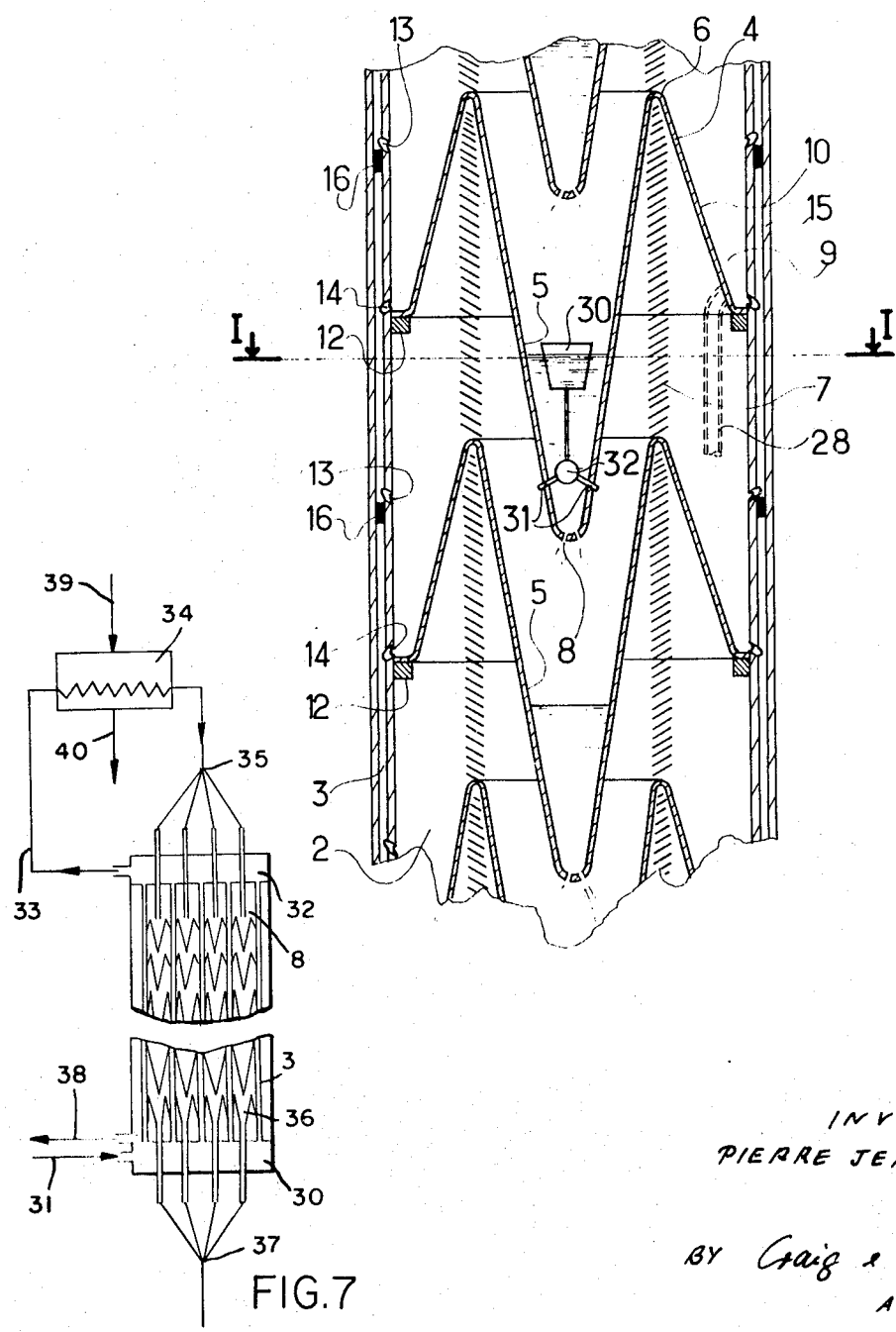

INVENTOR
PIERRE JEAN RICARD

BY Craig & Antonelli
ATTORNEYS

MULTISTAGE VERTICAL FLASH DISTILLATION APPARATUS HAVING LOW HEAT CONSUMPTION

The present invention concerns a distillation apparatus operating by successive evaporation and expansion for eliminating from a liquid the dissolved salts contained therein, and relates more particularly to the removal of salt from sea water by atomization of hot brine in the neighborhood of condensers cooled by sea water circulating vertically in laminar flow.

It is known that an installation for removing salt from sea water by such a process comprises a series of cells at gradually increasing temperatures and pressures, which are disposed in line, one beside the other, and each comprise a vapor condenser. The salt water passes in series through the successive condensers, thus becoming heated, whereafter it is subjected to a further heating at the exit from the cell at the highest pressure and temperature, and it then again passes, in the opposite direction, through the cells by way of appropriate overflows. At each expansion, a partial evaporation occurs, the vapor formed being condensed on the surface of the condensers and the water thus condensed being collected as it passes through the downstream cells.

For a given temperature of the heat source, the corresponding energy consumption per cubic meter of distilled water is proportionally greater as this hot source is caused to raise the temperature of the water further, i.e. also in proportion as the difference between the temperature of the water which evaporates in one cell and that of the cooling water of the condensers of the same cell is greater.

The improvement of the performance of an installation of this kind, which reduces the cost of the distilled water obtained, is consequently related to the reduction of the required temperature difference in question. The object of the present invention is therefore to employ means for achieving such a result, i.e. a greater output than has hitherto been obtained with a lower temperature differential.

For this purpose, the salt water or brine, which is subjected to successive evaporations, circulates vertically from the top downwards, passing from one stage to another through injectors which atomize it, and the jets of saline mist thus obtained are provided close to the cooling surfaces of the condensers. By these means, the sheet of water of a thickness troublesome to the evaporation is avoided, and the required height of the cells and the speed of conveyance of the vapor after evaporation are reduced.

In the known apparatus, the sheets of water situated at the base of the cells produce, by reason of their thickness, an appreciable difference between the mean temperature of the water to be evaporated and that of the vapor formed. This problem is eliminated by the atomizing technique according to the present invention. Under these conditions, the temperature difference between successive stages may be made very small and the height of the different stages reduced. This results in a reduction of the temperature difference between the cooling water circulating in the condenser of one cell and that of the vapor in the same cell.

Finally, the speed of conveyance of the vapor between the place of evaporation of the water and the surface on which the said vapor is condensed is very low, because the vapor conveyed corresponds only to a small condensation surface. Consequently, the loss of pressure of the vapor is insignificant and the entrainment of droplets of salt water is scarcely to be feared.

Such results are obtained by proper choice of the forms of the cooling surfaces, which do not consist of tubes, but of parallel plane metal sheets, between which the cooling water circulates at relatively low speed. The spacing between the sheets is made fairly small, less than 1 millimeter, in order to maintain between them a flow of the laminar type and to produce conditions of heat transmission which provide heat transmission coefficient values of the same order of magnitude as those of tubular condenser of conventional type, while ensuring acceptable pressure losses in the flow of cooling water in the said condenser.

The invention relates to an apparatus for the distillation of a liquid by successive evaporation and expansion, comprising an assembly of elemental cells in columnwise series, which are themselves disposed in parallel between an upper liquid receptacle and a lower liquid receptacle, characterized in that the vertical circulation of the fluids takes place in three different circuits: a rising cooling liquid circuit having laminar flow between the said columns and two downward flow circuits, one for liquid charged with salt and evaporating after spraying in the neighborhood of the cooled walls of the said columns, and the other for trickling liquid resulting from the vapor condensed along the latter.

The objects and advantages of the present invention will become apparent from the following description associated with the drawings, in which:

FIG. 2 shows a vertical section through the cell taken along line II—II of FIG. 1;

FIG. 7 is a schematic view depicting the streams of flow of the fluids during the process of the present invention.

Figure 1:
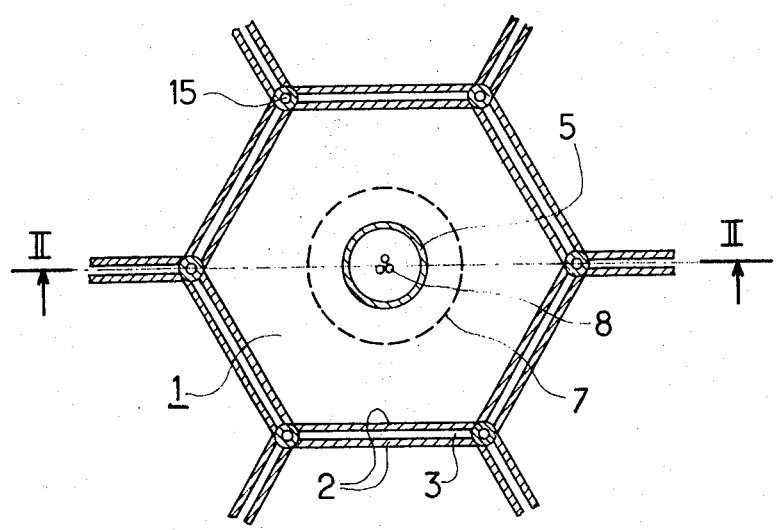
FIG. 1 is a horizontal section through a cell of hexagonal cross section taken along line I—I of FIG. 2.

A current cell 1 is illustrated in horizontal section in FIG. 1, including a portion of the walls of the juxtaposed neighboring cells, and in vertical section in FIG. 2. The sheet metal sections 2 form the walls of a prism having a hexagonal base constituting each column of superposed cells; on the other hand, the neighboring columns arranged in parallel are so juxtaposed as to form a honeycomb. The cooling water circulates from the bottom upwards through the narrow gap 3 situated between the outside surfaces of the said juxtaposed columns.

In each column of hexagonal cross section the superposed cells are separated from one another by partitions or diaphragms 4 having very pronounced corrugations, which form wells 5 and crests 6 of approximately circular form, intended to prevent the salt water from becoming mixed with the condensed water. In addition, annular louverlike separators 7 are provided to retain any salt water articles which may be entrained.

In a well 5, in which the salt water collects, the pressure of the water is added to the pressure difference between the cells to determine the rate of flow through the calibrated injectors 8 situated at the bottom of the pit. Thus, for a given rate of flow of salt water introduced into the apparatus, the level is fixed at a well-determined value. For given injection orifices, operation is possible between two rates of flow corresponding, respectively, to a water level slightly below that of the orifices 8 and complete emptying of the well 5. Operation with a rate of flow lower than the second limit would involve a certain passage of vapor from one cell to another. This would result in a lowering of the output, but would not interfere with the starting of the apparatus.

In addition, the margin of the possible rates of flow may be increased by means of a float 30 (FIG. 2) supporting a ball 32 which partially closes the cross-sectional outlet area of the well 5 by resting on the rods 31 when the water level falls below a certain value.

The water condensed on the cooling walls 2 collects in the peripheral troughs 9 situated between the sheet metal sections 2 of the hexagonal condensers and the flanges 10 of the downwardly bent partitions 4 having hexagonal ends 11 which are mounted on horizontal ribs 12 secured to the interior of the prismatic columns.

For the passage of the condensed water from one cell to another, calibrated orifices 13 and 14 are formed in tubes 15 situated in the angles of the prismatic columns and having internal partitions 16 between the cells. A water level is also established in each section. This arrangement prevents the accumulation of water in the troughs 9 and thus avoids reduction of the useful surface of the condensers.

Figure 3:
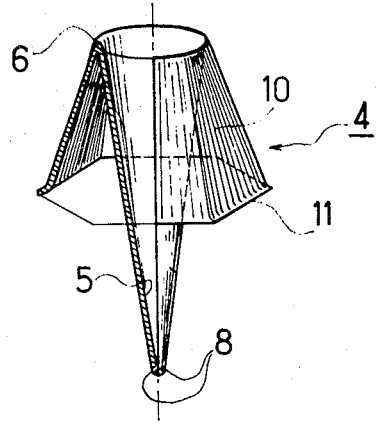
FIG. 3 illustrates in perspective the partition separating two superposed cells, partly in section.

The functional structure of a separating partition 4 between two cells will be more readily apparent from the perspective view of FIG. 3.

Figure 4:
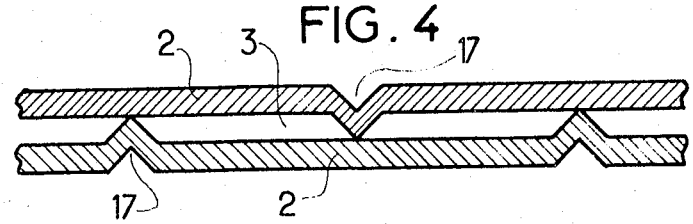
FIG. 4 is an enlarged sectional view of the juxtaposed side walls of two neighboring columns forming cooling surfaces.

FIG. 4 is an enlarged sectional view of two juxtaposed sheet metal sections of the walls of neighboring columns, in the gap 3 between which the cooling water circulates. In order to maintain a constant spacing between two sheet metal sections, projections 17 are alternately provided at intervals in the sheet metal sections disposed opposite one another, and the tip of each projection is held fast at the point of contact with the other sheet metal section by any known means.

The assembly of superposed cells within a hexagonal cylinder reaches a height which varies in accordance with the total temperature difference between the inlet and the outlet. Thus, with cells of a height of 5 centimeters and a temperature difference of 1° C. between adjacent cells, the height of a column, for a total temperature difference between the inlet and outlet of 70° C., will be of the order of 3.5 meters. The honeycomb formed by the juxtaposed hexagonal prisms may have a horizontal cross section of any area, the latter being determined by the total rate of flow to be obtained. A large distillation station may consist of a battery of elements operating in parallel, each element consisting of an assembly of hexagonal prisms in order to facilitate servicing.

Figure 5:
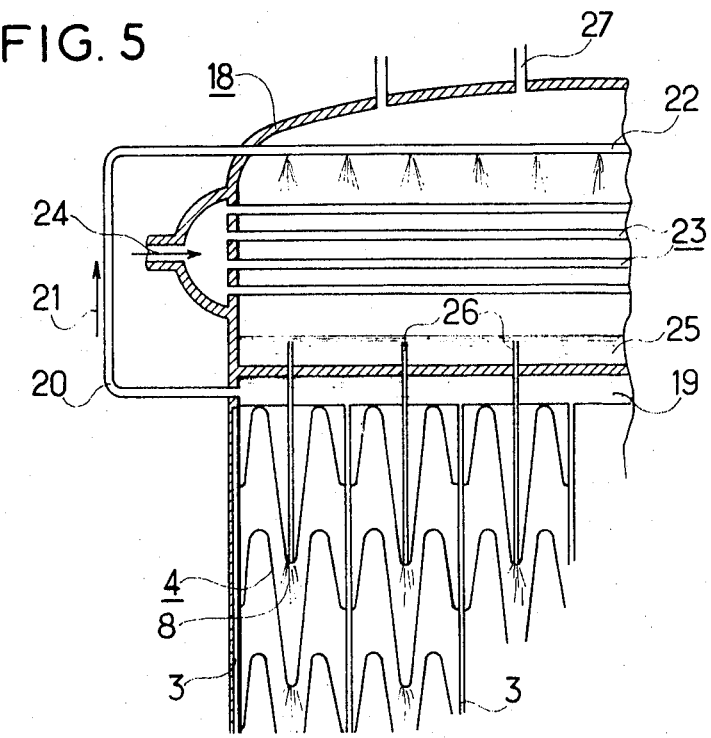
FIG. 5 illustrates in section the assembly of the upper water receptacle.

At the lower and upper ends of each column, the cooling water passages are connected to water receptacles. FIG. 5 illustrates the upper water receptacle 18 arranged as a water heater and degasifier. The salt water leaving the condensers, i.e. the gaps 3 between the columns, is collected in an enclosed space 19 above the upper partitions of the top cells, and then passes through an external pipe 20, in the direction indicated by the arrow 21, to a bank of atomizers 22. The water trickles on to the cluster of tubes 23, through which there passes the heating vapor entering in the direction of the arrow 24, and the heated water collects at 25, whence it passes through the overflow tubes 26 directly feeding the calibrated injectors 8. Disposed in the top of the receptacle 18 are the air extractors 27 for the elimination of air from the liquid to be treated.

The lower water receptacle, into which the cooling water is introduced, is vertically traversed by tubes for the discharge of the concentrated brine and of the distilled water produced, respectively.

To permit previous degasification of the water and recirculation of the brine, there may be provided in combination with the distillation columns according to the present invention a number of cells of usual construction. The slightly heated water leaving these cells is then degasified and mixed with the brine, the mixer entering the lower water receptacle of the distillation column. It is also possible in accordance with the present invention to provide between the preheating cells and the main distillation column two water receptacles permitting the discharge of the preheated water and the admission of the mixture.

To permit the additional degasification effected in the cell at the lowest temperature, the extraction of the air from one cell to another may be effected by one or more of the tubes 15 situated at the angles of the hexagons, which need not be employed for the extraction of the condensed water and which are partitioned between cells and communicate with the latter through small orifices.

It is to be understood that the invention is not limited to particular embodiment just described, but comprises any possible variants conforming to the general definition thereof which has been given. Thus, the cross section of the columns may be given other regular polygonal forms. For example, a cylinder having a square base may be adopted, or a very elongate rectangular arrangement may be employed, the injection of atomized water taking place in the plane of symmetry or median plane of the prism parallel to the larger side of the rectangle.

Figure 6:
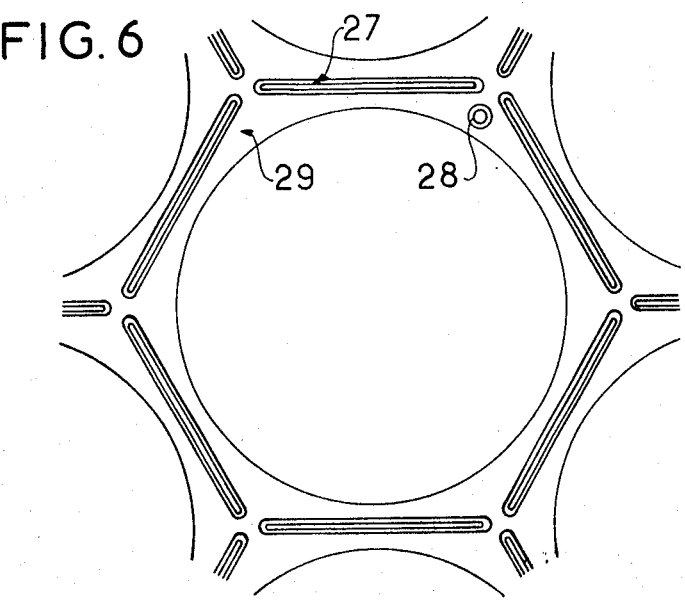
FIG. 6 is a variant of FIG. 1, the walls of the cell being formed of flattened tubes in hexagonal arrangement, through which the cooling water flows.

The sheet metal sections between which the cooling water circulates may be replaced by flattened tubes 27 shown in FIG. 6. These tubes are welded to the partitions between the cells, by which they are braced, so that punching of the walls to provide projections 17 is unnecessary. In this case, the tubes 15 (FIGS. 1 and 2) are omitted and the cells of a common level communicate with one another. The extraction of the condensed water or of the air from one cell to the other is then effected through tubes 28 secured to the partition, one of which is shown in dashed lines in FIG. 2.

The partitions between the cells may consist of members of rubberized material, of a form similar to that of FIG. 3, which, by reason of their elasticity, form a seal on the brackets 29 which brace the flattened tubes. The nozzles for the injection of salt water between the stages may then be driven into the lower part of the well of a rubber member, in the manner of a stopper, so that they may be replaced. The rubber members may be positioned and removed by means of pincers, which reduce their diameter.

FIG. 7 shows the circulation of the fluids during the process. The cold and deaerated brine enters the lower water box 30 of the distillation apparatus through the conduit 31, and then flows through the gaps 3 between the walls of the cells, where it is heated by the condensation of steam, to the upper water box 32. Then, it flows through the conduit 33 to the steam heater 34 which constitutes the heat source of the system. The heated brine flows through the conduits 35 which cross the upper water box to the injectors 8 of the upper cells, and then flows through the successive cells downwards as previously explained, where it is partially vaporized in the cells. The remaining brine is collected in the funnels 36 and evacuated through the conduits 37.

The distilled water which condenses on the walls of the cells flows from cell to the next lower cell, as previously explained, collects at the bottom of the last lower cell and is evacuated through the conduit 38.

Steam produced by a boiler (not shown), or bled from a steam turbine, enters the brine heater 34 through the conduit means 39. The condensed water returns to the boiler through the conduit 40. The system of deaeration and extraction of the air, being not specific to the present invention, is not represented in FIG. 7. The steam heater and the deaerator may be integrated in the upper water box as shown in FIG. 5.

Although this apparatus is intended more particularly for the removal of salt from sea water by distillation with low consumption from thermal energy employed in parallel and in accordance with a program common to an electrical generating station, it is to be understood that it is applicable to the distillation of any industrially or domestically employed liquid containing dissolved salts, the required heat emanating from any available heat source.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. An apparatus for distilling a liquid containing dissolved salts by successive evaporation and expansion, with low heat consumption, which comprises at least one polygonal column provided with vertical sidewalls, cooling means for condensing steam comprising a small gap along said sidewalls permitting laminar flow of cooling liquid therethrough, means for introducing a cooling medium to said cooling means, a plurality of horizontally disposed and vertically spaced transverse partition means dividing the column into a plurality of superposed stacked distillation cells, means for introducing heated brine into the uppermost cell, each of said partition means including a central portion for collecting liquid to be distilled and a peripheral portion for collecting liquid condensed on the inner face of said sidewall, said central portion of each transverse partition means being formed as a well having a plurality of calibrated holes at its lower end portion to permit the injection of the liquid to be distilled into an adjacent lower distillation cell whereby said liquid is atomized, the injection being effective under the action of the pressure difference between consecutive distillation cells, tube means providing communication between said adjacent distillation cells, thereby permitting the passage of condensed liquid from one cell to the next lower cell and means for discharging the condensed liquid from the last lower cell.

2. Apparatus as defined in claim 1 wherein said column and a lower liquid receptacle is disposed between an upper liquid receptacle including means for heating and deaerating the liquid to be distilled and for supplying said liquid to said column, the liquid to be distilled progressively cooling as it descends from cell to cell through said column.

3. Apparatus as defined in claim 2 wherein said condensing or cooling means includes additional sidewalls spaced from said sidewalls of said column and defining a gap therewith through which said cooling liquid is passed to cool the walls of said column.

4. Apparatus as defined in claim 3 wherein said additional sidewalls are discontinuous and are formed by the sidewalls of other columns identical to and disposed adjacent to said one column.

5. Apparatus as defined in claim 4 wherein the spacing between said sidewalls forming gaps therebetween is determined by means of projections alternately formed in the respective walls.

6. Apparatus as defined in claim 5 wherein said projections consist of projecting wall portions formed by deformations in said walls.

7. Apparatus as defined in claim 4, wherein the cross section of said columns is a regular polygonal adaptable for the assembly of a plurality of columns by juxtaposition.

8. Apparatus as defined in claim 2 wherein the peripheral portion of said partitions includes a polygonal lower end bearing against a horizontal rib secured to the inner wall surface of said column to form a collecting trough, said central portion and said peripheral portion of said partitions being joined by a substantially annular crest portion.

9. Apparatus as defined in claim 8 further including regulating means mounted in the central portion of said partitions for regulating the rate of injection of said liquid to be distilled into the adjacent distillation lower cell.

10. Apparatus as defined in claim 9 wherein said regulating means includes a float and a ball valve connected thereto.

11. Apparatus as defined in claim 8 wherein annular louvered separators are disposed between crest portions of adjacent partitions substantially concentric with the central portions thereof.

12. Apparatus as defined in claim 2 wherein said partitions are made of a rubberized material so as to ensure by their elasticity the positioning and fluid-tightness of the respective cells.

13. Apparatus as defined in claim 3, wherein the tube means are vertically disposed and are provided in the corners of said cells and are formed with orifices to permit the passage of condensed liquid and air from one cell to another.

14. Apparatus as defined in claim 2 wherein said condensing or cooling means is provided as a plurality of flattened tubes supported by said partitions and forming the vertical sidewalls of said column, said flattened tubes being spaced so that the cells of a common level in adjacent columns communicate with one another.

15. The apparatus of claim 2, wherein the upper liquid receptacle is provided with an atomizing means which discharges the cooling liquid around the heating means, and the condensing or cooling means communicates with an enclosed space above the upper transverse partitions of the top cells, said enclosed space in turn communicating with the atomizing means for conveying said cooling liquid to said atomizing means.

16. The apparatus of claim 15, wherein overflow tubes provide communications between the upper liquid receptacle and the central portion of the transverse partitions.